United States Patent Office 3,847,848
Patented Nov. 12, 1974

3,847,848
TWO-PART ROOM TEMPERATURE VULCANIZA-
BLE SILICONE RUBBER COMPOSITIONS
Melvin D. Beers, Ballston Lake, N.Y., assignor to
General Electric Company
No Drawing. Filed Dec. 4, 1972, Ser. No. 311,487
Int. Cl. C08g 51/72
U.S. Cl. 260—18 S                28 Claims

ABSTRACT OF THE DISCLOSURE

A two-component room temperature vulcanizable silicone rubber composition suitable for molding applications with deep section curing comprising a first part having therein a base linear fluid organopolysiloxane containing terminal silicon-bonded hydroxy groups and having a viscosity of 1,000 to 10,000,000 centipoise at 25° C. and a specially treated filler and having a second part which contains therein a silicate selected from (i) an organosilicate of the general formula, $$(R^5O)_3SiR^6$$

where $R^5$ is a radical selected from the class consisting of monovalent hydrocarbon radicals, halogenated monovalent hydrocarbon radicals and cyanoalkyl radicals and $R^6$ is selected from the class consisting of alkyl, haloalkyl, arylhaloaryl, alkenyl, cycloalkyl, cycoalkenyl, cyanoalkyl, alkoxy and aryloxy radicals, (ii) a partial liquid hydrolysis product of the aforementioned organosilicate and a metallic salt of an organic monocarboxylic or dicarboxylic acid.

BACKGROUND OF THE INVENTION

The present invention relates to a two-part room temperature vulcanizable silicone rubber composition and, more particularly, the present invention relates to a two-part room temperature vulcanizable silicone rubber composition that has low viscosity, high tear strength, as well as other high physical properties and good knotty tear and deep section curing, as well as being thixotropic prior to cure.

In the past it has been desired to utilize silicone rubber compositions and, in particular, room temperature vulvulcanizable silicone rubber compositions for molding applications. Thus, it has been desired to form molds from silicone rubber compositions and, particularly, room temperature vulcanizable silicone rubber compositions, from which the various types of parts could be fabricated.

Room temperature vulcanizable silicone rubber compositions were particularly preferred for this application sinne they are easier to work with and manipulate with the hands prior to the curing of the composition. One of the difficulties with the utilization of room temperature vulcanizable silicone rubber compositions for molding applications is that such compositions do not have a sufficiently high enough tear strength, and particularly, they do not have enough knotty tear. Thus, not only would such compositions tear but further, and in addition, the tear would go right through the entire fabricated part.

Accordingly, it was desired to devise a room temperature vulcanizable silicone rubber composition for molding applications which would have the property known as knotty tear, that is, when a tear forms on the fabricated part that the tear would only go up to a point and then stop.

In addition, it was desired that such a silicone rubber composition would have a high tear strength, such that it would not tear easily. One of the means for obtaining such a high tear strength for such room temperature vulcanizable silicone rubber compositions was to increase the amount of filler in the composition. However, with prior art room temperature vulcanizable silicone rubber compositions, the addition of filler to the silicone rubber composition, while it would improve the physical properties of the composition and particularly the tear strength of the composition, nevertheless, the resulting composition became very viscous prior to cure, such that it was very difficult to utilize in molding applications. Such very viscous room temperature vulcanizable silicone rubber compositions could be manipulated by hand only with difficulty and could be utilized to obtain impressions of objects with some difficulty. In addition, it was very difficult to rid the composition as it was being molded prior to cure, free of air bubbles.

With the prior art room temperature vulcanizable silicone rubber compositions in which was incorporated excess amounts of filler, it was found that such compositions would structure after a short period of shelf aging and would not be suitable for molding applications or for other types of applications where it was desired to have a low viscosity prior to the cure of the composition.

Further, with such room temperature vulcanizable silicone rubber compositions of the prior art, it was not possible to obtain deep section curing of the composition without the addition of water to the precured silicone rubber composition. The composition itself was not free flowing and it would not pick up fine impressions from objects so as to form a suitable mold. A low viscosity precured room temperature vulcanizable silicone rubber composition which when cured would have high physical properties, that is, good elongation, tensile strength and tear strength, is highly desirable in the silicone rubber field.

Thus, it is one object of the present invention to provide a room temperature vulcanizable silicone rubber composition that prior to cure may have an acceptable viscosity as well as being free flowing.

It is another object of the present invention to provide for a room temperature vulcanizable silicone rubber composition that, after cure, would have high physical properties and, in particular, a high elongation, a high tear strength and good knotty tear.

It is an additional object of the present invention to provide a room temperature vulcanizable silicone rubber composition with deep section cure without the presence of moisture and would be free flowing but thixotropic prior to cure.

It is a further object of the present invention to provide for a room temperature vulcanizable silicone rubber composition that could have high amounts of filler in it and would not structure or gel prior to cure even upon being stored for a period of time, as long as 4 years, and would not have a noticeable increase in viscosity even after being stored on the shelf for prolonged periods of time. In other words, an extremely shelf stable precured room temperature vulcanizable silicone rubber composition.

It is still another object of the present invention to provide for a two-part room temperature vulcanizable silicone rubber composition that is extremely suitable for molding applications.

These and other objects of the present invention are accomplished by means of the invention set forth below.

SUMMARY OF THE INVENTION

There is provided in accordance with the above objects, a two-component room temperature vulcanizable silicone rubber composition suitable for molding applications with deep section cure and knotty tear comprising a first part and a second part, wherein the first part comprises (a) a base linear fluid diorganopolysiloxane containing terminal silicon-bonded hydroxy groups and having a viscosity of 1,000 to 10,000,000 centipoise at 25° C., where the organic groups of said diorganopolysiloxane are selected from the class consisting of monovalent hydrocarbon radicals, halogenated monovalent hydrocarbon radicals and cyanoalkyl radicals, and (b) from 5% to 300% by weight, based on the linear diorganopolysiloxane, of a treated silica filler product prepared by (i) contacting per 100 parts of silica filler having a surface area of at least 50 square meters per gram and containing from .2% to 2% by weight of moieties selected from the class consisting of hydroxyl groups, water and mixtures thereof, with (1) from ½ part to 5 parts of a hydroxyl amine having the formula, (1)
$$R^1 - N - OH$$
$$\quad\ |$$
$$\quad R^2$$

(2) from 2 to 25 parts of a cyclic siloxane of the formula, (2) $\quad (R_2^3SiO)_n$ and (3) from 1 to 20 parts of a silyl nitrogen compound of the formula, (3) $\quad (R_3^4Si)_aX$ wherein the above additives are simultaneously contacted with said filler at a temperature in the range of 100° to 180° C. and (ii) removing residual amounts of said additives from the filler, where $R^1$ is selected from the class consisting of monovalent hydrocarbon radicals, halogenated monovalent hydrocarbon radicals, $R^2$, $R^3$ and $R^4$ are all selected from the class consisting of hydrogen, monovalent hydrocarbon radicals and halogenated monovalent hydrocarbon radicals, $n$ varies from 3 to 4, $a$ is a whole number that varies from 1 to 2, X is selected from the class consisting of $-NR^5Y$, $-ONR_2^5$, and

$$-N-$$
$$\ |$$
$$\ Y$$

where $R^5$ is selected from monovalent hydrocarbon radicals and halogenated monovalent hydrocarbon radicals and Y is selected from hydrogen and $R^5$ radicals.

The second part of the two-part RTV silicone rubber composition comprises from 1 to 15% by weight of a silicate based on the weight of the base linear diorganopolysiloxane selected from the class consisting of (1) a monomeric organosilicate corresponding to the general formula, (4) $\quad (R^5O)_3SiR^6$ where $R^5$ is a radical selected from the class consisting of monovalent hydrocarbon radicals, halogenated monovalent hydrocarbon radicals and cyanoalkyl radicals and $R^6$ is selected from the class consisting of alkyl, haloalkyl, aryl, haloaryl, alkenyl, cycloalkyl, cycloalkenyl, cyanoalkyl, alkoxy and acyloxy radicals and (2) a liquid partial hydrolysis product of the aforementioned organosilicate, and (2) from 1% to 5% by weight, based on the linear organopolysiloxane of a catalyst which is a carboxylic acid salt, alkoxide, hydroxide or oxide of a metal ranging from lead to manganese, inclusive, in the electromotive series of metals which includes lead, tin, zirconium, antimony, iron, cadmium, barium, calcium, titanium, bismuth and manganese, with tin being the most preferred metal catalyst.

The treated filler is the most important and critical ingredient of the two-part RTV composition as set forth above. In addition to the treated filler there may be used at a concentration of 5% to 100% based on the weight of the base linear diorganopolysiloxane fluid of an untreated filler which may be chosen from any of the well known untreated fillers that are known in silicone chemistry for room temperature vulcanizable silicone rubber compositions. In addition to these other well known fillers, there may be utilized as an untreated filler as an additive in addition to the treated filler, fumed silica or precipitated silica. With respect to the treated filler, the initially treated filler may comprise all fumed silica or all precipitated silica or, in the alternative, there may be present in the treated filler 5% to 95% by weight of fumed silica with the rest of the treated filler being precipitated silica. In addition to the above ingredients, there is utilized in the first part a tert-alkoxypolysiloxane as disclosed in Beers, U.S. Pat. 3,438,930, which patent is hereby incorporated into the present specification by reference and a first viscosity depressant which is also a deep section cure agent and a second viscosity depressant fluid. In addition, there may be utilized in the first part of the two-part room temperature vulcanizable silicone rubber composition a pigment. In the second part of the two-part room temperature vulcanizable silicone rubber composition there may be utilized, in addition to the monomeric organosilicate and metal catalyst, 0.1% to 5% by weight, based on the said silicate, of an aqueous solution of a low aliphatic alcohol. The use of such an alcohol in the second part improves the knotty tear of the cured two-part room temperature vulcanizable silicone rubber composition.

DESCRIPTION OF THE PREFERRED EMBODIMENT

In formulas (1), (2) and (3), the $R^2$ radical, the $R^3$ radical and the $R^4$ radical are preferably selected from hydrogen, monovalent hydrocarbon radicals and halogenated monovalent hydrocarbon radicals and mixtures thereof. Thus, the $R^2$ radical, the $R^3$ radical and the $R^4$ radical may be individually selected from the group consisting of mononuclear and binuclear aryl radicals, such as phenyl, tolyl, xylyl, naphthyl, etc.; halogenated and mononuclear and binuclear aryl radicals, such as chlorophenyl, chloronaphthyl, etc.; mononuclear aryl lower alkyl radicals having from 1 to 8 carbon atoms in the alkyl groups, such as, benzyl, phenylethyl, etc.; lower alkyl radicals having from 1 to 8 carbon atoms, such as, methyl, ethyl, propyl, butyl, pentyl, hexyl, octyl, etc.; lower alkenyl radicals having from 2 to 8 carbon atoms such as vinyl, allyl, 1-propenyl; haloaryl radicals having from 1 to 8 carbon atoms such as chloropropyl, trifluoropropyl, and cycloalkyl radicals such as cyclobutyl, cyclopentyl, cyclohexyl. The $R^1$ radical may be selected from any of the above monovalent hydrocarbon radicals and halogenated monovalent hydrocarbon radicals but may not be hydrogen. In addition, any of these radicals, the $R^1$, the $R^2$, $R^3$, and $R^4$ radicals may be a mixture of any of the above enumerated organic substituent groups. In any of the molecules of the hydroxylamine, the $R^2$ radicals may be hydrogen.

With respect to the compounds of formulas (1), (2) and (3) used to treat the silica filler, whether it be purely fumed silica or precipitated silica or a mixture of fumed silica and precipitated silica, only up to 33% of the organic substituent groups in the molecule may be hydrogen. The rest of the radicals in the molecule have to be selected from the above enumerated monovalent hydrocarbon radicals and halogenated monovalent hydrocarbon radicals. Preferably, the radicals $R^2$, $R^3$ and $R^4$ are all selected from the above enumerated monovalent hydrocarbon radicals and halogenated monovalent hydrocarbon radicals. More preferably, the $R^1$, $R^2$, $R^3$ and $R^4$ in formulas (1), (2), and (3) are selected from lower alkyl radicals having 1 to 8 carbon atoms such as methyl and ethyl and mononuclear aryl radicals such as phenyl. The most preferred substituent groups for $R^1$, $R^2$, $R^3$ and $R^4$ are lower alkyl radicals of 1 to 8 carbon atoms. The hydroxyl amines of formula (1) are well known compounds and are manufactured by Pennwalt Corporation, Three Penn Center, Philadelphia, Pa. This compound must have a hydroxyl group appended to the nitrogen. With respect to the other organic substituent groups that are attached to the nitrogen, one of them may be hydrogen but preferably both of them are hydrocarbon radicals, such as lower alkyl radicals of 1 to 8 carbon atoms.

The cyclic siloxane of formula (2) is also a well known material, whether it be a cyclictripolysiloxane or a cyclic-tetrapolysiloxane. In the process of the present invention, the cyclictripolysiloxane is preferred although in some cases the cyclictetrapolysiloxane may be used in the treatment process in the less preferred embodiment. These cyclic siloxanes are produced and manufactured by silicone manufacturers, for instance, see Lucas, U.S. Pat. 2,983,009.

The preferred cyclic siloxane reactant in the present case is the cyclictripolysiloxane within the scope of formula (2) above, since this compound has the greatest reactivity in the present process and will result in the largest amount of substitution of the diorganosiloxy groups on the free hydroxyl groups in the silica filler. Thus, even though the cyclic tetrapolysiloxane can be produced in the present invention such as treated filler is suitable for many silicone rubber products, nevertheless, for the preferred product of the present case the filler must be treated with a cyclictripolysiloxane within the scope of formula (2) above.

The other treatment additive of the silica filler is the silicon-nitrogen compound of formula (3). In such a compound, only up to 22 mole percent of the $R^4$ radicals in any molecule can be hydrogen atoms. The rest have to be selected from the above recited monovalent hydrocarbon radicals and halogenated monovalent hydrocarbon radicals. Preferably, all the $R^4$ radicals are monovalent hydrocarbon radicals and halogenated monovalent hydrocarbon radicals, such as lower alkyl radicals from 1 to 8 carbon atoms. In the broad, generic formula of the compound of formula (3), the silazane compound is the preferred compound when $a$ is 2. Again, although the aminoxy compound within the scope of formula (3) above and the amine compound within the scope of formula (3) may be used in the treatment process, nevertheless, when such compounds are utilized there is not used the most preferred treatment procedure. It was found that the most reactive type of additive that could be used in the treatment process within the scope of the present invention is a silazane.

The most preferred treated filler is the one which imparts to the resulting product the most advantageous properties, that is, the highest physical properties. The highest shelf stability and lowest viscosity is obtained when there is utilized in the reaction of the present invention a silazane within the scope of the compound of formula (3) above. The most preferred compound within the scope of formula (1) above, is hydroxylethylamine. The most preferred compound within the scope of formula (2) is hexamethyltrisiloxane and the most preferred compound within the scope of formula (3) above is hexamethyldisilazane.

The hydroxyl amine treating additive is preferably utilized in a concentration of approximately ½ part to 5 parts based on 100 parts of the silica filler. A lower amount than ½ part does not result in a desirable catalytic effect on the other treating agents and a large amount of more than 5 parts has not been found to be useful. The most preferred amount of the hydroxyl amine treating agent has been found to be 1 to 3 parts based on 100 parts of the silica filler. As stated previously, the treated silica filler can be solely fumed silica or precipitated silica. On the other hand, it may comprise generally 5 to 95% by weight of fumed silica and the rest of the filler may be precipitated silica. Most preferably, the amount of fumed silica in the composition of the silica to be treated may be present in a concentration of 10 to 90% by weight of fumed silica and 10 to 90% by weight of precipitated silica.

The cyclic siloxane of formula (2) above is generally used at a concentration of 2 to 25 parts based on 100 parts of the silica filler. It has been found that less than 2 parts of the cyclic siloxane does not result in proper treatment of the filler and above 25 parts of the cyclic siloxane is not found to result in any enhancement of the treatment of the filler. Preferably, the cyclic siloxane of formula (2) above is utilized in the treatment process of the silica filler at a concentration of 5 to 14 parts and, most preferably, 8 to 9 parts per 100 parts of the silica filler.

The silyl-nitrogen compound is preferably used at a concentration of 1 to 20 parts based on 100 parts of the silica filler. The use of the silyl-nitrogen compound at a concentration of less than 1 part is not found to enhance the results in an acceptably treated filler.

The use of the silazane in excess of 20 parts has been found not to result in any enhancement in the treatment procedure. The preferred concentration of the silyl-nitrogen compound for formula (3) above in the process for treating the silica filler is a concentration of 7 to 15 parts and, most preferably, from 12 to 13 parts based on 100 parts of the silica filler. The silyl-nitrogen compounds of formula (3) above are well known compounds and have been known to silicone manufactures as, for instance, exemplified in the disclosure of U.S. Pat. 3,635,743. It should be pointed out that the process for treating the silica filler as set forth in the present disclosure, can be used to treat any type of filler having free hydroxyl groups therein. The silica fillers that are treated in accordance with this treatment procedure generally have a surface area that may vary anywhere from at least 50 square meters per gram to as high as 300 to 500 square meters per gram.

A necessary aspect of the process for treating the filler is that there must be a certain amount of free hydroxyl groups and/or absorbed water in the silica filler or mixture of fillers in order for the treating process to operate. Thus, generally, there must be at least 0.2% by weight of free hydroxyl groups in the filler and no more than 2% by weight of the water based on the weight of the filler or mixture of fillers. If there is more than this amount of water in the filler, then the free hydroxyl groups and absorbed water in the filler, the water will deleteriously affect the reaction and the reactivity of the silyl-nitrogen compound.

In the treating process to produce the preferred silica filler that is utilized in the room temperature vulcanizable silicone rubber composition of the present case, the filler that is to be treated has present from .4% to .8% by weight of hydroxyl groups or absorbed water therein. With this amount of hydroxyl groups in the filler, the filler is in the form of a free flowing powder and it has been found that the various treating agents have the highest activity and react with or substitute in the most efficient manner with the free hydroxyl group in the filler. If there is too little water in the filler, water can be added to the filler in small amounts so that it will have a proper water content. If on the other hand the filler has too much water in it, the water can be removed by a heating procedure while at the same time passing a stream of inert gas over it, such as nitrogen.

The critical part of the treatment of the silica filler comprises in taking the silica filler, having the above-defined surface area and free hydroxyl content and contacting it simultaneously at the proper concentration with the hydroxyl amine, the cyclic siloxane and silyl-nitrogen compounds. It has been found that all three ingredients, that is, the hydroxyl amine, cyclic siloxane and the silyl-nitrogen compound, must be used simultaneously and at the same time to contact and treat the filler. Thus, if the treatment agents are used separately to treat the filler, then it has been found that such a process as, for instance, disclosed in U.S. Pat. 3,635,743, does not produce a treated filler that has the properties of the filler produced by the treatment process as set forth herein. The removal of any of these three ingredients from the treatment step results in an inferior treated filler to the filler that is utilized in the silicone rubber composition of the present invention.

Preferably, the treatment process is carried out at a temperature of 100° C. to 180° C. for 1 to 8 hours while the filler is constantly being agitated. Of course, the agitation is not a necessity in the process of the present case but it is preferred. The most preferred reaction temperature for the treatment of the filler with the above treating ingredients is a temperature in the range of 135° C. to 180° C. It must be understood that the kettle in which the treatment procedure is to be carried out should be sealed properly. Pressure will develop in the kettle as a result of the treatment process due to the evaporation of the treating agents. If desired, excess amount of the treating ingredients can be used and the reaction can be carried out at substantially atmospheric pressure, however, no advantage is to be gained by such a process. However, the reaction may be carried out at excessively high temperatures so as to enhance and speed up the reaction. Thus, preferably, the reaction is carried out in a pressure vessel which is maintained at a pressure of 10 to 100 p.s.i.g. at the preferred temperature range disclosed above.

It is most preferred to carry out the process at a temperature in the range of 145° C. to 155° C. wherein the filler is treated with the three ingredients of formulas (1), (2) and (3) for a time generally of 1 to 8 hours and, more preferably 3 to 5 hours. Samples of the thus treated filler may be removed from the reaction kettle and the filler tested in the aminoxy structure test so as to determine whether it has been treated sufficiently. When the proper flow properties are obtained in the aminoxy structure test, then the treatment procedure can be terminated. However, if it is not desired to follow the reaction periodically as it proceeds, the reactants can be allowed to react intermittently with the filler for a period of as long as 8 hours or more and, at the end of that time, the filler will be treated sufficiently to pass the criterion of the aminoxy structure test.

After the treatment period has been terminated, the kettle is opened and the remaining amounts of additives that may be present in the kettle are stripped off by heating the kettle and the contents in the temperature range of 150° C. to 200° C. and, more preferably, in the temperature range of 185° C. to 200° C.

It is desirable in this stripping procedure to remove all the nitrogen compounds from the filler, that is, the hydroxyl amine of formula (1) and the silyl-nitrogen compound of formula (3). At the end of this stripping procedure, the filler is tested by acid filtration for ammonia and the stripping is discontinued when it is found that there is 50 parts per million of nitrogen or less in the filler. If there is more nitrogen present, it is preferred that this nitrogen, whether in the form of a silicon compound or not, be removed since it will undesirably affect the properties of the silicone rubber composition into which the filler is incorporated. Thus, it may give an undesirable color to the silicon rubber composition into which the filler is incorporated.

It has been found that a filler when treated in accordance with the process of the present invention, when incorporated into low viscosity silanol-terminated diorganopolysiloxanes will not disadvantageously increase the viscosity of such polysiloxanes and, in addition, the resulting room temperature vulcanizable silicone rubber composition has desirable free flowing properties and impression making properties.

In addition, such a filler can be utilized in room temperature vulcanizable silicone rubber compositions in large amounts and, when so utilized, will give the resulting cured silicone rubber composition enhanced physical properties such as tensile strength, elongation and tear, more particularly, high tear properties.

In addition, the low viscosity of such silicone rubber compositions, that is, the combination of the treated filler in accordance with the above disclosure with the silanol-terminated diorganopolysiloxanes which is a low viscosity material, if desired, allows such low viscosity material to be handled easily and eliminates the need to handle such compositions specially in order to remove air bubbles from the mixture prior to cure, etc. One particular noticeable affect of such low viscosity silicone rubber compositions that are produced by the mixing of the filler treated in accordance with the above procedure with silanol-terminated diorganopolysiloxanes is that the resulting composition goes through a thixotropic stage. Thus, they can be utilized very easily to form molds and the like without excessive overflowing of the composition while it is being formed.

Utilizing the process of the present invention, there is obtained a uniquely treated filler, that is, a filler having 4 to 20% by weight of the filler of chemically combined triorganosiloxy units of the formula $R^4_3Si$—, and 2 to 10% by weight of chemically combined diorganosiloxy units of the formula $R^3_2Si$—, where $R^4$ and $R^3$ are as defined previously.

In evaluating the filters treated in accordance with the above disclosure, which treated fillers are preferred in two-part room temperature vulcanizable silicone rubber compositions of the present case, there is utilized in evaluating such fillers the aminoxy stretch structure test. In this test, the treated filler is mixed with a silanol-stopped dimethylpolysiloxane having a viscosity of 2500 to 3500 centipoise at 25° C. into which is incorporated aminoxy curing agents such as 1,3,5,7,7-pentamethyl-1,3,5-tris(diethylaminoxy)cyclotetrasiloxane and 1,3,5,5,7,7-hexamethyl-1,3 - bis(diethylaminoxy)cyclotetrasiloxane, where there is used 16 parts of the latter curing agent to 1 part of the former curing agent. This aminoxy curing agent is a very rapid curing agent which starts to cross-link any silanol-containing material almost immediately. To the 16 parts of the silanol-stopped dimethylsiloxane oil there is added .05 part of the aminoxy curing agent mixture and 2.5 parts of the filler treated in whatever manner or untreated filler, for that matter. These ingredients are then mixed together by hand or by machine for 1 to 2 minutes and then a portion of the mixture is placed on the cup of a Boeing Flow Jig manufactured by Union Gear Company, Waterford, N.Y., which measures the flow properties of the mixture, that is, in the Boeing Flow Jig, the mixture is placed in a bowl and then the horizontal Jig is taken and placed on one end so that the polysiloxane can flow vertically downward from the bowl onto the scale. The amount of flow downward due to the force of a gravity after 35 seconds is measured in inches of flow. With the filler treated in accordance with the above disclosure, such a filler when tested in accordance with the above aminoxy structure test will flow 4 inches on the scale in 35 minutes, which amount of flow is not equalled by any other filler treated by any other prior art treatment procedures. For more detail as to the process for treating the silica fillers which is preferred in the present invention, one is referred to the patent application of Melvin D. Beers entitled "Process for Treating Silica Fillers," Docket No. 8S1–1399, filed on the same date as the present application.

Although the two-part room temperature vulcanizable silicone rubber composition of the present case may be produced utilizing fillers treated by other methods, nevertheless, the most preferred treated filler that is desirable to be incorporated into a silanol-terminated linear based diorganopolysiloxane of the present case is the filler treated in accordance with the above procedure. It is only when the silica filler treated in accordance with the above procedure and is incorporated into the present room temperature vulcanizable silicone rubber composition that there is obtained the advantageous high cured strength and low viscosity two-part room temperature vulcanizable silicone rubber composition prior to cure of the present case. The above treated filler does not undesirably increase the low viscosity of the silanol-terminated linear based diorganopolysiloxane fluid and, at the same time, it increases the physical properties of the cured silicone rubber composition, especially the tear strength of the silicone rubber composition. Thus, the most preferred treated filler that is utilized with the two-part room temperature vulcanizable silicone rubber composition of the present case is the filler treated in accordance with the above procedure. In such a treated filler, it is preferred that there be 10% of precipitated silica having a surface area of approximately 300 square meters per gram and 90% of fumed silica having a surface area of 200 square meters per gram.

In addition, even though it is indicated that in the broad embodiment of the present case, that the treated filler may be present at a concentration of 5% to 300% by weight based on the base linear silanol-terminated diorganopolysiloxane fluid, in the more preferred embodiment there is utilized 10 to 80% of the treated silica filler treated in accordance with the above procedure based on the silanol-terminated linear base diorganopolysiloxane fluid of the room temperature vulcanizable silicone rubber composition of the present case.

In addition, in the room temperature vulcanizable silicone rubber composition there may be utilized, in addition to the treated filler treated in accordance with the above disclosure, other types of treated fillers or non-treated fillers. These fillers may be utilized in a concentration of 5% to 100% by weight based on the weight of the silanol-terminated base linear diorganopolysiloxane fluid of the present case, that is, a fluid having a viscosity of 1,000 to 10,000,000 centipoise at 25° C. More preferably, the silanol-terminated base linear diorganopolysiloxane has a viscosity of 12,000 to 90,000 centipoise at 25° C. with the most preferred viscosity range of 15,000 to 35,000 centipoise at 25° C.

Illustrative of the many fillers treated with other procedures than the one disclosed above or non-treated fillers which may be employed in addition to the filler treated in accordance with the above disclosure in the silicone rubber composition of the present invention are titanium dioxide, lithopone, zinc oxide, zirconium silicate, silica aerogel, iron oxide, diatomaceous earth, calcium carbonate, fumed silica, silazane-treated filler, silica, precipitated silica, octamethylcyclotetrasiloxane - treated silica, glass fibers, magnesium oxide, formic oxide, zirconium oxide, aluminum oxide, crushed quartz, calcined clay, asbestos, carbon, graphite, cotton synthetic fibers, etc. There can also be incorporated into the room temperature vulcanizable silicone rubber composition of the present case, in addition to the filler, various flame retardants, stabilizing agents and plasticizers such as siloxane fluids. Suitable flame retardants include antimony oxide, various polyhalogenated hydrocarbons and organic sulfonates.

The preferred base linear fluid diorganopolysiloxane containing terminal silicon-bonded hydroxy groups and having a viscosity of 1,000 to 10,000,000 centipoise when measured at 25° C., has preferably the formula, (5)

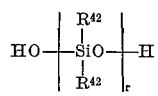

where $R^{42}$ is selected from monovalent hydrocarbon radicals and halogenated monovalent hydrocarbon radicals and $r$ is a whole number that varies from 300 to 5,260. More preferably, the base linear diorganopolysiloxane has a viscosity of 12,000 to 90,000 where the value of $r$ varies from 770 to 1,350. In the most preferred embodiment, the base linear diorganopolysiloxane has a viscosity of 15,000 to 35,000 centipoise where the value of $r$ varies from 825 to 1,100. The radical R is preferably selected from the class consisting of alkyl radicals such as methyl, ethyl, propyl, butyl, hexyl, etc.; aryl radicals such as phenyl, diphenyl, methyl and etc.; alkenyl radicals such as tolyl, xylyl, ethylphenyl and etc.; aralkyl radicals such as benzyl, phenyl, ethyl, and etc.; haloaryl and haloalkyl such as chlorophenyl, tetrachlorophenyl, difluorophenyl and etc.; and alkenyl radicals such as vinyl, allyl, etc. Further, R may also represent cyanoalkyl, cycloalkyl and cycloalkenyl radicals. The R groups attached to a single silicon radical may be the same groups or different groups. It has been found that at least 50% and preferably 70 to 100% of the R groups in the diorganopolysiloxane molecule should be methyl. Further, the diorganopolysiloxane can be a homopolymer or a copolymer such as, for example, it has different types of units in the chain such as dimethyl, diphenyl, methylphenyl, etc.

The organopolysiloxanes of formula (5) may also be represented by the average unit formula, (6) 

where $R^{42}$ is as defined above and the value of $m$ may vary from 1.99 to 2. The average unit formula includes organopolysiloxanes having terminal groups other than hydroxy such as monofunctional and trifunctional terminal groups. However, in the present case, it is preferred that the terminal groups be hydroxy and the monofunctional and trifunctional groups be kept to a minimum.

Preparation of the diorganopolysiloxanes of formulas (5) and (6) may be carried out by any of the procedures well known to those skilled in the art. Such polysiloxanes can be produced by following a procedure involving hydrolysis of one or more hydrocarbon substituted dichlorosilanes in which the substituents consist of saturated or unsaturated hydrocarbon groups to produce a crude hydrolyzate containing a mixture of linear and cyclic polysiloxanes. The crude hydrolyzate is then treated with a suitable catalyst such as KOH so that it can be depolymerized to form a mixture of low boiling, low molecular weight cyclic polymers and undesirable materials such as the monofunctional trifunctional chlorosilane starting material. The resulting composition is fractionally distilled and there is obtained a pure product containing the low boiling, low molecular weight cyclic polymers free of any significant amount of monofunctional and trifunctional groups.

In order to depolymerize the crude hydrolyzate there is added to said hydrolyzate a strong base such as KOH and the mixture is heated at a temperature in the range of 150° C. to 175° C. under an absolute pressure of 100 mm. of Hg to produce and remove by evaporation of product consisting of low molecular weight cyclic polysiloxanes comprising, for example, about 85 percent of the tetramer and 15 percent of the mixed trimer and pentamer. Among the cyclic polymers that may so be produced are hexamethylcyclotrisiloxane, octamethylcyclotetrasiloxane and dimethylcyclopentasiloxane. There also may be formed mixtures of cyclopolysiloxanes such as a mixture of octamethylcyclotetrasiloxane and ethylmethylcyclotetrasiloxane, and mixtures of cyclic polymers of dimethylsiloxane with cyclic polymers of diphenylsiloxane, cyclicmethylphenylsiloxanes and cyclicmethylvinylsiloxanes.

The pure cyclic polysiloxanes are mixed in the desired proportions to obtain the desired mixture. Then the mixture of the cyclic polysiloxanes are subjected to an equilibration procedure to obtain a linear diorganopolysiloxane. The equilibration is preferably carried out at temperatures of about 125° C. to 150° C. in the presence of a small amount of rearrangement catalyst such as potassium hydroxide, tetrabutyl phosphonium hydroxide, etc. The amount of catalyst used will depend on the extent of the polymerization desired. Generally, 40–50 p.p.m. (parts per million) of the catalyst is sufficient for the polymerization to the produce diorganopolysiloxane polymers of a viscosity of $5 \times 10^5$ to $1.0 \times 10^7$ centipoise measured at 25° C. There is also present in the reaction mixture 15–150 p.p.m. (parts per million) of water based on the cyclic polymer so as to supply the hydroxy groups which function as chain-stoppers for the linear diorganopolysiloxane material that is formed. After the equilibration reaction has preceded for two hours there is reached an equilibration point wherein the mixture contains about 85° linear polymers and the amount of linear polymers being formed from the cyclic polymers is equal to the cyclic polymers being formed from the linear polymers.

When this equilibration point has been reached there is added to the mixture a sufficient amount of an acid donor that will neutralize the KOH catalyst so as to terminate the polymerization reaction. Preferably, 1.7 parts per million of acetic acid are added to the reaction mixture to liberate HCl which reacts with and neutralizes the KOH and so terminates the equilibration reaction. The cyclicdiorganosiloxanes in the reaction mixture are then distilled off to leave the polydiorganosiloxane polymer which is useful in the present invention. The resulting linear diorganopolysiloxanes are chain-stopped primarily with hydroxy groups and have a viscosity of $5 \times 10^5$ to $1.0 \times 10^7$ centipoise at 25° C. Further, the number of diorgano substituent groups in the siloxane chain is at least 2,150.

Then high molecular weight diorganopolysiloxanes having a viscosity of $5 \times 10^5$ centipoise at 25° C. and above can be treated with water to arrive at low molecular weight diorganopolysiloxanes having a viscosity of 1,000 to 90,000 centipoise at 25° C. This may be accomplished by blowing steam across the surface of the high molecular weight product or through the polymer for a sufficient length of time to obtain the low molecular weight component having the desired silanol content. Thus, if it is desirable to obtain the low molecular weight diorganopolysiloxane from a portion of the high molecular weight diorganopolysiloxanes by the above water treatment which is well known to those skilled in the art so as to reduce the number of diorganosiloxy units from above 5,260 to a value in the neighborhood of 300. The use of steam in this fashion will cause a decrease in the viscosity of the polymer while at the same time the formed linear polysiloxane will have terminal silicon-bonded hydroxy groups.

Alternatively, the low molecular weight diorganopolysiloxanes can be produced from the high molecular weight diorganopolysiloxane by adding water to them and heating the resulting composition at elevated temperatures of 150° C. to 170° C. so as to break up the long chain polymers into smaller chains. The amount of water used will vary depending upon such factors as the molecular weight of the polymer being treated, the time and the temperature at which the mixture of high molecular weight diorganopolysiloxanes are heated and the desired viscosity. These conditions may readily be determined. For example, a high molecular weight diorganopolysiloxane having a viscosity of 2,000,000 centipoise at 25° C. may be heated to 150° C. with 0.5 percent by weight of water for two hours to arrive at a low molecular weight diorganopolysiloxane having a viscosity of 2,000 centipoise. Preferably, the low molecular weight organopolysiloxane is produced so that it has a viscosity of 12,000 to 90,000 centipoise at 25° C.

In order for the diorganopolysiloxane fluids to cure there must be present in the second part of the composition the cross-linking agent of formula (4). In that formula, $R^5$ groups may be alkyl radicals such as methyl, ethyl, propyl, isoproply, butyl, amyl, isoamyl, octyl, isooctyl, decyl, doecyl; haloalkyl such as the chlorinated, brominated, fluorinated alkyl radicals. In addition, $R^5$ may represent aryl, aralkyl and alkenyl radicals such as vinyl, allyl, phenyl, tolyl, xylyl, benzyl, phenylethyl, naphthyl, anthracyl, biphenyl, as well as the halogen-substituted derivatives of the above radicals. In addition, $R^5$ may represent cycloalkenyl, cycloalkyl and cyanoalkyl radicals. The radical $R^6$ represents the same radicals as $R^5$ and, in addition, preferably represents alkoxy and aryloxy radicals such as methoxy, ethoxy, butoxy, and phenoxy.

In addition to the monomeric organosilicates of formula (4), there is also preferably used as a cross-linking agent, liquid partially hydrolyzed products of the monomeric silicates. Such hydrolysis products are obtained by effecting partial hydrolysis in water of the particular monomeric organosilicate in the presence of small amounts of acid to a point where it is still water-insoluble and still possible to isolate a liquid partially hydrolyzed organosilicon compound. Thus, the ethyl silicate having the formula $(C_2H_5O)_4Si$ may be partially hydrolyzed by adding acids or acid-forming metal salts to the liquid monomeric organosilicate such as $FeCl_3$, $CuCl_2$, $AlCl_3$, $SnCl_4$ and thereafter effecting suitable hydrolysis of this mixture of ingredients in water to obtain in the two-phase composition from which the water-insoluble, partially hydrolyzed organosilicate can readily be separated from the aqueous phase and catalyst. The partially hydrolyzed ethyl silicate is sold under the tradename Ethyl Silicate–40, by Union Carbide Corporation.

The liquid partial hydrolysis products of the monomeric organosilicate can also be obtained by adding to the organosilicate an aqueous solution of an aliphatic alcohol of the formula, (7) 

where $R^{13}$ is a radical selected from the class consisting of alkyl and cycloalkyl preferably of 1 to 8 carbon atoms in the presence of the metal catalyst. Preferably, the alcohol is dissolved in water at a concentration of 1 to 10% by weight. The aqueous solution of the alcohol is added at a concentration of 0.1 to 10% by weight based on the monomeric organosilicate and preferably at a concentration of 0.1 to 5% by weight based on the monomeric silicate, in combination with the metal catalyst which is generally added at a concentration of 0.1 to 5% and preferably 0.1 to 3% by weight based on the linear base diorganopolysiloxane of formula (5). The use of such aqueous solution of an alcohol to form the partial hydrolysis product of the monomeric organosilicate imparts "knotty tear" to the resulting cured silicone rubber composition.

Generally, there is added from 1 to 15.0% by weight of the cross-linking agent of formula (4) and preferably 0.1 to 10% by weight based on the weight of the base linear diorganopolysiloxane. If more than 15.0% by weight of cross-linking agent is used, the excess does not function as a cross-linking agent since the initial hydroxy positions on the organopolysiloxane are already reacted with the cross-linking agent and the excess acts as a filler which reduces the elasticity of the cured silicone rubber composition. If less than 0.1% by weight of cross-linking agent is used, there is not sufficient cross-linking agent to react with with the organopolysiloxane to form the cured silicone rubber.

Although the preferable cross-linking agents are organosilicates, there may also be used as cross-linking agents organopolysiloxane resins having a functionality greater than 2 and preferably greater than 2.5. The organopolysiloxane resins are methylsiloxanes, or resins which contain both monoethyl and dimethyl or monophenyl units. There may also be used ethylsiloxane resins in which the ratio R to Si ratio is 1.4 to 1 and which mixture contains 15% of butoxy groups or there may be used resins in which the ratio R to Si is 1.1 to 1 and which contains 10% of methoxy groups or there may be used methylphenylsiloxane resins containing 50% of monomethyl units, 25% of dimethyl units and 25% of monophenyl units.

Other suitable cross-linking agents are organohydrogenpolysiloxanes of the formula, (8) $$R_a^{43}HSiO_{\frac{3-a}{2}}$$

in which $R^{43}$ is an alkyl or aryl radical and $a$ is a number less than 2, but is not zero. The organohydrogenpolysiloxane crosslinking agents have the disadvantage that during curing there is evolved hydrogen gas which can result in bubbles being trapped in the silicone rubber composition. Although the above cross-linking agents can be used in the compositions, the organosilicates are preferred since the processability of the composition is facilitated and the cured silicone rubber composition has better physical properties.

In addition to the above compounds in the present composition, there may be utilized a branched or straight polymer compound composed of $(R^{42})_2SiO$ units, $$(R^{42})_3SiO_{1/2}$$

units and $R^{42}SiO_{3/2}$ units where there are present 0.1% to 8% by weight of hydroxyl radicals and the viscosity of the polymer is between 500 to $1.0 \times 10^5$ centipoise at 25° C., and the $R^{42}$ radicals are as defined previously. The ratio of the organosiloxy units to the diorganosiloxy units is from 0.11 to 1.4 and the ratio of the triorganosiloxy units to the diorganosiloxy units is from 0.02 to about 1. inclusive.

As pointed out previously, in addition to the cross-linking agents, which is either the monomer organosilicate or the partial hydrolysis product of the monomeric organosilicate, there is utilized in the second part of the two-part room temperature vulcanizable silicone rubber composition a curing catalyst. The curing catalyst is a carboxylic acid salt, hydroxide, alkoxide and/or oxide of a metal ranging from lead to manganese, inclusive, in the electromotive series of metals. The particular metals included are lead, tin, nickel, cobalt, iron, cadmium, chromium, zinc and manganese. The carboxylic acids from which the salts of these metals are derived from and the monocarboxylic acids or dicarboxylic acids and the metallic salts can be either soluble or insoluble in the silanol chain-stopped linear base diorganopolysiloxane of formula (5) above. Preferably, the salts employed are soluble in the silanol chain-stopped linear base polydiorganosiloxanes since this facilitates the uniform dispersion of the metal salt in the reaction mixture, when the second part of the two-part room temperature vulcanizable silicone rubber composition is mixed in with the first part so as to form the cured silicone rubber composition that is desired.

Illustrative of metal salts which can be employed are, for example, zinc naphthenate, lead naphthenate, cobalt naphthenate, iron-2-ethylhexoate, cobalt, octoate, zinc octoate, lead octoate, chromium octoate and tin octoate. Operative metal salts include those in which the metal ion contains a hydrocarbon substituent such as, for example, carbomethoxyphenyl tin, tris-uberate, isobutyl tin triceroate, cyclohexenyl lead triactotinate, xenyl lead trisalicylate, dimethyl tin dibutyrate, basic dimethyl tin oleate, dibutyl tin diacetate, dibutyl tin dilaurate, divinyl tris-di-acetate, dibutyl tin dibenzoate, dibutyl tin dioctoate, dibutyl tin maleate, dibutyl tin adipate, diisoamyl tin bis-trichlorobenzoate, diphenyl lead diformate, dibutyl tin dilacetate, dicyclopentyl lead bis-monochloroacetate, dibenzyl lead di-2-pentanoate, diallyl lead di-2-hexenoate, triethyl tin tartrate, tributyl tin acetate, triphenyl tin acetate, tricyclohexyl tin acrylate, tritolyl tin terephahalate, tri-n-propyl lead acetate, tristearyl lead succinate, trinaphthyl lead p-methylbenzoate, trisphenyl lead cyclohexenyl acetate, triphenyl lead ethylmalonate, etc.

The amount of the metal salts of the organic carboxylic acid or dicarboxylic acid which is employed as a function of the increased rate is the function of the curing rate desired, so that any amount of such salt up to the maximum effective amount for increasing the cure rate can be employed. In general, no particular benefit is derived from employing more than about 5% by weight of such metal salt based on the weight of the silanol chain-stopped linear base diorganopolysiloxane of formula (5) above. In addition, the metal salt has little effect on the cure rate when it is used at a concentration of less than 0.1% by weight based on the weight of the silanol chain-stopped linear base diorganopolysiloxane. Preferably, the metal salt, alkoxide, or oxide is utilized at a concentration of 0.1 to 3% by weight.

The metal alkoxide which can be used as catalysts in the practice of the present invention include dibutyl tin dimethoxide, dimethyl tin diethoxide, dibutyltin dibutoxide, tin tetra-isopropoxide, tin tetramethoxide and tributyl tin methoxide. Preferably, the metal catalyst may be dialcotinalkoxide such as dibutyl tin dimethoxide, dimethyl tin diethoxide, dimethyl tin dimethoxide including hydroxyl alkyl tin salts such as hydroxy dimethyl tin oleate and dihydroxy methyl tin oleate. Solubilized dibutyl tin oxide is also a very effective catalyst. This solubilized dibutyl tin oxide can be purchased from Argus Chemical Corporation, 633 Court St., Brooklyn, N.Y. 11231. Thus, the catalyst and particularly the metal catalyst which can be utilized as the curing catalyst in the silicone rubber compositions of the present case and which is particularly incorporated along with the organosilicate whether it is a monomeric organosilicate or a partially hydrolysis product of a monomeric organosilicate is a metal salt, alkoxide, hydroxide or oxide of a monocarboxylic acid or dicarboxylic acid in which the metal is selected from lead to manganese in the electromotive series of metals.

In the preferred embodiment of the present invention, the monomeric organosilicate is mixed with the metal catalyst and there is added to this mixture within the concentration range shown above an aqueous solution of an alcohol such as a 2% by weight aqueous solution of N,N-propyl alcohol, where the amount of the aqueous solution of alcohol may vary at a concentration of 0.1 to 10% by weight based on the weight of the monomeric organosilicate. There results from this mixture a composition containing a partial hydrolysis product of the monomeric organosilicate and the metal catalyst. This mixture is the preferred second part of the silicone rubber composition of the present invention, which second part is mixed with the first part containing the silanol chain-stopped linear base diorganopolysiloxane and the filler such that when the two parts are mixed there results a third silicone rubber composition which preferably has the advantages mentioned previously. In particular, the foregoing second part of the present silicone rubber composition which is prepared as defined previously imparts to the resulting cured silicone rubber composition improved "knotty tear," that is, when the cured silicone rubber composition tears the tear does not propagate itself but stops after travelling a short distance along the thickness of the cured silicone rubber composition of the present case.

In addition, the use of the above catalyst system indicated above will result in a composition being both free flowing and also thixotropic prior to cure such that it can be handled very easily by the worker skilled in the art in making molds and molding forms.

Utilizing the above components, there is obtained room temperature vulcanizable silicone rubber compositions that, as an example, may have a tensile strength of about 600 p.s.i., a Shore A durometer of about 30, an elongation of 300% or over and a tear strength of about 150 p.s.i. or over. This silicone rubber composition may be further improved by adding other components to it. Particularly, to the first part of the two-part room temperature vulcanizable silicone rubber composition there may be added to the mixture of the silanol chain-stopped linear base diorganopolysiloxane and filler a low molecular weight tert-alkoxy organopolysiloxane fluid which is composed of chemically combined units of $R_2^{42}SiO$ with a mixture of tert-alkoxy diorganosiloxy units of the formula $(R_3^{11}CO)R_2^{42}SiO_{1/2}$ and hydroxy diorganosiloxy units of the formula $(HO)R_2^{42}SiO_{1/2}$, wherein the ratio of the tert-alkoxy diorganosiloxy units to the hydroxy diorganosiloxy units is less than 1, where $R^{42}$ is as previously defined and $R^{11}$ is a lower alkyl radical of 1 to 8 carbon atoms such as, methyl, ethyl, propyl and etc. Preferably, the above tert-alkoxy diorganopolysiloxane fluid has a viscosity that may vary from 1,000 to 10,000 centipoise at 25° C. and more preferably it may vary anywhere from 2,500 to 4,500 centipoise at 25° C. In addition, preferably, the ratio of the tert-alkoxy diorganosiloxy units to hydroxy diorganosiloxy units varies anywhere from 0.2 to 0.9. Preferably, the tert-alkoxy group is t-butoxy.

This material is added to the composition so as to lower the viscosity of the resulting two-component room temperature vulcanizable silicone rubber composition when the second part is mixed in with the first part and also to improve the knotty tear of the resulting cured silicone rubber composition and in addition to increase the elongation of the cured silicone rubber composition. Preferably, the tert-alkoxy organopolysiloxane fluid is utilized at a concentration of 5 to 60% by weight based on the silanol chain-stopped base linear diorganopolysiloxane fluid of formula (5). More preferably, it is utilized at a concentration of 30 to 50% by weight based on the weight of the silanol chain-stopped base linear diorganopolysiloxane fluid.

For further information as to the composition as well as the method of preparing this tert-alkoxy organopolysiloxane fluid, one is referred to the disclosure of Beers, U.S. Pat. 3,438,930, which disclosure is hereby incorporated into the present application by reference.

Thus, effective results can be obtained if sufficient tert-alkoxy organopolysiloxane is utilized in combination with the silanol-terminated polydiorganosiloxane to provide a polymer having a ratio of tert-alkoxy siloxane units to silanol of .05 to .9 and preferably .2 to .8 tert-alkoxy dialkylsiloxy units per silanol.

In addition, the present composition can also contain minor amounts, for example, of up to about 20% of monoorganosiloxy units such as monoalkyl siloxy units, e.g., monomethyl siloxy units and monophenyl siloxy units. The technology involved in incorporating monoalkyl siloxy units into room temperature vulcanizable silicone rubber compositions is disclosed in U.S. Pat. 3,382,205 of Beers, which disclosure is hereby incorporated into the present application by reference.

In addition to the tert-alkoxy organopolysiloxane fluid there are added two additional viscosity depressants to the first part of the two-part room temperature vulcanizable silicone rubber composition of the present case. The main purpose of these additives as the identification of them applies is to lower the viscosity of the resulting first-part, that is, the first part containing the silanol chain-stopped linear base diorganopolysiloxane fluid and filler mixture. Thus, in the preferred embodiment there is desirably present at a concentration of 0.2 to 10% by weight based on the weight of the silanol chain-stopped linear base diorganopolysiloxane fluid a first viscosity depressant and deep section curing agent of the formula, (9) 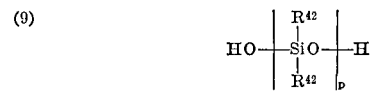

where $R^{42}$ is a radical selected from the class consisting of monovalent hydrocarbon radicals, halogenated monovalent hydrocarbon radicals, and cyanoalkyl radicals and $p$ is a whole number that varies from 2 to 46. The radical $R^{42}$ in the above formula is defined in the same manner as the radical $R^{42}$ in the formula (5) above of the silanol chain-stopped linear base diorganopolysiloxane fluid. Thus, the first viscosity depressant of formula (9) above is a well known composition and includes compositions containing different R groups. For example, some of the R groups can be methyl while others in the R groups can be phenyl and/or beta-cyanoethyl. Furthermore, within the scope of the definition of the diorganosiloxane of the first viscosity depressant of formula (9) useful in this invention are copolymers of various types of diorganosiloxane units such as silanol chain-stopped copolymers of dimethylsiloxane units, diphenylsiloxane units and methylphenylsiloxane units, or for example, copolymers of dimethylsiloxane units, methylphenylsiloxane units, and methylvinylsiloxane units. Preferably, at least 50% of the R radicals in formula (9) above are methyl groups.

The first viscosity depressant of formula (9) has a viscosity that generally varies from 10 to 100 centistokes at 25° C. and more preferably from 15 to 50 centistokes at 25° C. In the most preferred embodiment, preferably, the value of $p$ varies from 3 to 9 in formula (9) above. It is quite important that for the first viscosity depressant to function as desired it generally should have from 0.2 to 20% by weight of hydroxyl content based on the weight of the first viscosity depressant fluid and preferably from 5 to 15% by weight of hydroxyl groups. Preferably, the viscosity depressant is utilized at a concentration of generally 0.2 to 20% by weight based on the weight of the silanol chain-stopped linear base diorganopolysiloxane fluid of formula (5) above, and more preferably at a concentration of 1% to 5% by weight.

The first viscosity depressant additive has two functions. First, to act as an additive to the first part of the two-part room temperature vulcanizable silicone rubber composition of the present case so as to lower the viscosity both of the first part and also of the resulting mixture when the first part is mixed with the second part, that is, to maintain the resulting mixture of the first part and the second part as a fluid that is free flowing which can rid itself of air bubbles and can be easily manipulated or molded by hand while still thixotropic. Thus, the silanol chain-stopped linear base diorganopolysiloxane fluid of formula (5) above is used such that it has a viscosity of anywhere from 12,000 to 90,000 centipoise at 25° C. which is the more preferred viscosity range of this fluid in the two-part room temperature vulcanizable silicone rubber compositions of the present case. In a more preferred embodiment, there is utilized such a fluid of a fluid of formula (5) of a viscosity of 12,000 to 60,000 centipoise at 25° C. The addition of the first viscosity depressant in the amount shown above will maintain the resulting fluid at the same viscosity even though there has been added to it as much as 100% or even 300% by weight of the fluid of formula (5) above of the preferred treated silica filler of the present case. The most preferred viscosity for the silanol chain-stopped linear base diorganopolysiloxane fluid of formula (5) above is, of course, 25,000 to 35,000 centipoise at 25° C., and even at this low viscosity with the addition of as much as 50% and 100% by weight of the fluid of formula (5) above of treated silica filler the resulting mixture will only change slightly in viscosity if the first viscosity depressant of the present case is added to it in the above-disclosed concentrations.

The other function of the first viscosity depressant is to provide a large amount of hydroxyl groups to the two-component room temperature vulcanizable silicone rubber composition, such that it will have deep section curing even in the absence of moisture or water. Optionally, there may be a second viscosity depressant present in the first part of the two-part room temperature vulcanizable silicone rubber composition of the present case. Thus, in the most preferred embodiment, there is preferably present at a concentration of 0 to 50% by weight based on the silanol chain-stopped linear base diorganpolysiloxane fluid of formula (5) above of a second viscosity depressant fluid of the formula,

(10) 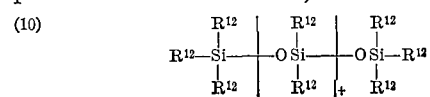

wherein said fluid may have a viscosity of 5 to 10,000 centipoise at 25° C., and preferably has a viscosity of 10 to 100 centistokes at 25° C., $t$ is a whole number that generally varies from 2 to 700, and $R^{12}$ is selected from the class consisting of alkyl radicals, halogenated alkyl radicals, aryl radicals, halogenated aryl radicals and cyano-alkyl radicals of up to 8 carbon atoms. Thus, when the second viscosity depressant of formula (10) above is utilized in the present invention most preferably it is utilized at a concentration of 30 to 50% by weight of the silanol chain-stopped linear base diorganopolysiloxane fluid of formula (5) above.

The second viscosity depressant fluid is utilized at a concentration of as much as 30% by weight to as much as 50% by weight. It should be noted that the utilization of this second viscosity depressant fluid is optional and the main purpose of the utilization or the use of such second viscosity depressant fluid is to maintain the viscosity of the resulting first part of the two-part room temperature vulcanizable silicone rubber compositions of the present case at as low a viscosity as possible, even in the case where there is added as much as 300% by weight of filler treated in accordance with the above disclosure based on the weight of the silanol chain-stopped linear base diorganopolysiloxane fluid of formula (5) above.

Most preferably, the second viscosity depressant fluid has a viscosity that varies from 5 to 100 centistoke at 25° C. in which case $t$ in formula (10) above varies from 2 to 46. Also, in the most preferred embodiment, $R^{12}$ in formula (10) above is selected from methyl and phenyl radicals and most preferably from lower alkyl radicals of 1 to 8 carbon atoms such as methyl, ethyl, phenyl, etc. It should be noted that the use of the second viscosity depressant fluid of formula (10) above in the present invention is optional and may not be utilized at all, especially if the first viscosity depressant fluid of formula (9) is utilized in the two-part room temperature vulcanizable silicone rubber compositions of the present case. The main purpose of this second viscosity depressant fluid as denoted by its name is to lower the viscosity of the resulting first part of the two-part room temperature vulcanizable silicone rubber composition and to maintain it at as low as possible even with the addition of large amounts of filler to it. Thus, when the first viscosity depressant fluid and the second viscosity depressant fluid are utilized in the first part of the two-part room temperature vulcanizable silicone rubber composition of the present case, then the viscosity may be maintained as close as possible and within a few thousand centipoise of the viscosity of the silanol chain-stopped linear base diorganopolysiloxane fluid of formula (5) above, even with the addition to such a fluid of formula (5) above of as much as 200% by weight and 300% by weight based on the weight of the fluid of silica filler treated in accordance with the above disclosure.

As stated previously, there may be added also to the first part of the two-part room temperature vulcanizable siliccene rubber composition, 0.1 to 2% by weight based on the silanol chain-stopped linear base diorganopolysiloxane of formula (6) above of the pigment that is desired in the composition.

As pointed out previously, other ingredients and additives such as, flame retardant additives may also be added to the two-part silicone rubber composition of the present case. Thus, any of the well known additives that are normally utilized or can be utilized with two-part room temperature vulcanizable silicone rubber compositions can also be used in the silicone rubber composition of the present case.

In the preparation of the first part of the two-part room temperature vulcanizable silicone rubber composition of the present case, there is preferably prepared a master batch where a large portion of the silanol chain-stopped linear base diorganopolysiloxane fluid is mixed with all the filler and the pigment. The remaining silanol linear base diorganopolysiloxane fluid is then mixed with the tert-alkoxy organopolysiloxane fluid, the first viscosity depressant and the second viscosity depressant. Then to this mixture there is added the master batch and the final mixture is formed of the first part of the room temperature vulcanizable silicone rubber composition. In the most preferred embodiment, the second part is formed by taking the monomeric or organosilicate and mixing into it the metal catalyst and then adding to this mixture the aqueous alcohol solution. The two parts are then ready to be packaged and stored for whatever period is desired. Then after a period of 6 months, 1 year to as long as 2 or 3 years, the two parts may be taken and mixed together to form a silicone rubber composition that will form a skin in a period of 10 to 20 minutes and will cure to the final hard rubbery state, that is, the composition will reach total cure in a period of 24 hours or so. It is obvious, of course, that the admixture of the above ingredients can be carried out in the presence of an inert solvent. In addition, the first part of the above two-part room temperature vulcanizable silicone rubber composition can be also packaged in solvent and then the first part can be added to it when it is desired to form a cured silicone rubber composition and the resulting material can be applied to whatever surface it is desired in the form of a solution, whereupon when the solvent evaporates due to atmospheric conditions there will remain behind a hard silicone rubber material. As pointed out, the mixture as well as the application of the two-part room temperature vulcanizable material can be carried out in the presence of an inert solvent.

Suitable solvents include hydrocarbons such as, benzene, toluene, xylene or petroleum ethers; halogenated solvents such as, perchloroethylene or perchlorobenzene; and organic ethers such as diethylether and dibutylether; ketones such as, methylisobutylketone and fluid hydroxyl-free polysiloxanes.

The presence of a solvent is particularly advantageous when the silanol chain-stopped linear base diorganopolysiloxane is a high molecular weight material. The solvent reduces the overall viscosity of the composition and facilitates cure. Of course, in molding applications where a low viscosity silanol chain-stopped linear base diorganopolysiloxane fluid is utilized the solvent is not necessary. A solution in which the first part is dissolved in a solvent and stored and then the first part is applied in the form of a solution with the second part so that upon evaporation of the solvent the composition cures to a rubbery solid, is particularly advantageous in coating applications.

The room temperature vulcanizable silicone compositions of this invention are stable prior to the mixing of the two parts together. Consequently, they can be stored for prolonged periods of time without deleterious effects. This is especially true with the silicone rubber compositions of the present case having the fillers treated in accordance with the above disclosure.

The silicone rubber compositions of this case have a shelf stability of six months or more to as long as two years or more. During this period of storage, no significant change occurs in the physical properties of the compositions. This is of particular importance from commercial standpoints and insures that once a composition is prepared with certain resistancy and cure time that neither will change significantly upon storage. The fact that with the filler treated in accordance with the above procedure the present composition has enhanced storage stability is one of the characteristics which makes the compositions of this invention particularly valuable. Within the broad limits indicated above it is, of course, recognized that components may be varied as is desired to obtain different properties in the final cured silicone rubber composition. Thus, with a particular silane some variation in the properties of the cured silicone rubber are obtained by varying the molecular weight as measured by the viscosity of the silanol chain-stopped linear base polydiorganosiloxane fluid. For a given system as the viscosity of the silanol chain-stopped linear base diorganopolysiloxane fluid increases the elongation of the cured rubber increases. On the other hand, with the low viscosity material the cured rubber has a lower elongation and an increased hardness.

The present two-part room temperature vulcanizable silicone rubber composition in addition to molding applications has many uses in sealing, caulking or coating applications.

The foregoing examples are presented for the purpose of illustrating the invention more fully and not for the purpose of defining the limits of the invention. All parts in the examples are by weight.

EXAMPLE 1

The following ingredients were mixed together under high shear conditions at a temperature range of 120° to 130° C. for 6 hours and then cooled to room temperature; 70 parts of silanol-terminated dimethylpolysiloxane of 30,000 centipoise at 25° C. viscosity; 30 parts of partially t-butoxy and silanol-terminated polydimethylsiloxane having an OH to t-butoxy ratio of 2.7 and a viscosity of 3,000 centipoise; 27 parts of a trimethylsilyl-terminated polydimethylsiloxane having a viscosity of 20 centipoise at 25° C.; 1.8 parts of a silanol-terminated polydimethylsiloxane having a silanol content of 6.8% by weight and a viscosity of 15 centipoise at 25° C.; and 29 parts of treated silica filler treated as expained below. The resulting viscosity of the mixture which is referred to as Composition A was 55,000 centipoise at 25° C.

There was prepared a Composition B as follows: first, to 3.5 parts of n-propyl silicate were added 0.6 parts of 2.0% aqueous n-propanol and 1.0 part of dibutyl tin dilaurate under vigorous agitation. To the above mixture there was added the following composition: 3.9 parts of trimethylbutyl-terminated dimethylpolysiloxane having a viscosity of 3,000 centipoise; 0.4 parts of silica filler treated as explained below and 0.6 parts of pigment. The above mixture forms Composition B.

To 100 parts of Composition A, there was added 10 parts of Composition B and they were mixed until a smooth uniform composition was obtained. The mixture remained pourable over a period of 60 minutes after mixing and cured to an elastomeric composition after a period of 12 hours at room temperature. A portion of the above material was cured into ASTM molded slabs for 24 hours. These slabs when tested had the following physical properties:

Tensile strength (p.s.i.) _____ 600
Elongation (percent) _____ 400
Die B, tear strength (p.i.) _____ 150
Shore A, hardness _____ 30

It was observed when pulling the Die B specimens that the material was very resistant to the propagation of the tear intended by means of the applied stress.

The treated filler in the above composition was prepared as follows: 90 parts of fumed silica having a surface area of 200 sq. meters per gram and 10 parts of a precipitated silica filler having a surface area of 300 sq. meters per gram were mixed and the moisture content was adjusted to 0.5 to 1.0% by weight. This mixture was heated up to 145°–170° C. and then there was added to it, 22 parts of a solution consisting of 12 parts of hexamethyldisilazine, 8 parts of hexamethylcyclotrisiloxane and 2 parts of diethylhydroxylamine. This mixture was maintained at the above temperature conditions and under sealed pressure conditions for 6 hours. After this time, the filler was devolatilized through vacuum stripping to a nitrogen content of less than 50 p.p.m. as determined by acid titration for ammonia. The material was cooled to room temperature and utilized in the above composition.

A portion of the above mixture of Composition A and Composition B prior to cure was poured into 3-inch deep aluminum cup. After curing the material for 24 hours the elastomeric plug formed in the cup was removed and was to be completely cross-linked through the entire composition.

There was also prepared a filler treated in an alternative manner which procedure of treatment is as follows: 90 parts of a fumed silica filler having a surface area of 200 square meters per gram and 10 parts of a precipitated silica filler having a surface area of 300 sq. meters per gram were mixed together and the moisture content adjusted to 0.5 to 1.0% by weight. This filler composition was heated to a temperature range of 145° to 170° C. at which time there was added to it 8 parts of hexamethylcyclotrisiloxane and the mixture was heated for 6 hours. At the end of that time, the volatile material was removed through vacuum stripping. After the devolatilization, there was added to the filler 2 parts of diethylhydroxylamine and the mixture maintained at 145° to 170° C. for 6 hours. Then the mixture was devolatilized until the filler had a nitrogen content of less than 50 p.p.m. At this point and at the same temperature, there was added to the filler 12 parts of hexamethyldisilazane and the mixture cooked in a sealed vessel for 6 hours. At the end of that time the mixture was devolatilized until it had a nitrogen content of less than 50 p.p.m.

This filler was incorporated into the same identical composition as Composition A and Composition B referred to above, except that this alternatively prepared filler was used in place of the filler prepared in accordance with the prior treatment procedure which prior procedure is the method disclosed in the present case for treating fillers that are to be used in the compositions of the present case.

The resulting cured ASTM molded slabs which were cured for a period of 24 hours had the following physical properties:

Tensile strength (p.s.i.) _____ 450
Elongation (percent) _____ 300
Die B, tear strength (p.i.) _____ 75
Shore A, hardness _____ 35

The viscosity of the mixture after the two parts corresponding to Composition A and Composition B were mixed together to form a uniform mixture was 90,000 centipoise at 25° C. It was also observed that the composition after a uniform mixture of the two parts was obtained was no longer pourable after 15 minutes.

EXAMPLE 2

There was prepared a first part which shall be referred to as Composition C which comprises the same ingredients at the same concentrations as that referred to in Example 1, utilizing the treated filler which was treated in accordance with the present disclosure.

The second part of the room temperature vulcanizable silicone rubber composition which hereinafter shall be referred to as Composition D was prepared as follows: to 3.8 parts of a trimethylsilyl-terminated polydimethylsiloxane of a viscosity of 3,000 centipoise at 25° C., there was added 0.4 part of a treated silica filler prepared in accordance with the procedure of the present case as set forth in Example 1; 2.75 parts of iron oxide; 2.5 parts of partially condensed ethyl silicate; and 0.5 part of dibutyl tin oxide containing 24% by weight of tin.

To 100 parts of Composition C there were added 10 parts of Composition D and these two compositions were mixed together until a uniform mixture was obtained. This composition remains pourable for 30 minutes after mixing and then goes through a thixotropic stage for 45 additional minutes during which time it can be manipulated and at the end of that time it reaches the gel stage and finally at the end of 3 hours it reaches the elastomeric stage at which time it can be easily peeled off a mold. The composition was cured into ASTM molded slabs which had the following physical properties:

Tensile strength (p.s.i.) _____ 640
Elongation (percent) _____ 370
Die B, tear strength (p.i.) _____ 160
Shore A, hardness _____ 32

EXAMPLE 3

There was prepared a first part of the room temperature vulcanizable silicone rubber composition of the present case which shall hereinafter be referred to as Composition E, comprising: 70 parts of a silanol-terminated polydimethylsiloxane having a viscosity of 15,000 centipoise; 30 parts of a partially t-butoxy and silanol-terminated polydimethylsiloxane having a ratio of t-butoxy to OH of 2.7 and a viscosity of 3,000 centipoise at 95° C.; 30 parts of a trimethylsilyl-terminated polydimethylsiloxane having a viscosity of 20 centipoise at 25° C.; 1.8 parts of silanol-terminated polydimethylsiloxane having a silanol content of 6.8% by weight and a viscosity of approximately 15 centipoise at 95° C.; and 29 parts of a treated silica filler prepared in accordance with the procedure of the present case as set forth in Example 1. The resulting Composition E has a viscosity of 25,000 centipoise at 25° C.

The second part of the room temperature vulcanizable silicone rubber composition which hereinafter shall be referred to as Composition F had the same ingredients at the same concentrations as Composition D of Example 2.

To 100 parts of Composition E there were added 10 parts of Composition F and the resulting compositions were mixed until a uniform mixture was obtained. The uniform mixture was pourable for 30 minutes, and then for the next 45 minutes was in a thixotropic stage during which time it was spreadable until at the end of the 45 minute period it reached a gel stage. After a 3-hour period, the mixture reached the elastomeric stage such that it could be peeled off a mold.

When Compositions E and F were first mixed to form a uniform mixture the resulting mixture had a viscosity of 25,000 centipoise at 25° C. A portion of the above mixture of Compositions E and F was used to form ASTM molded slabs which slabs were cured for 24 hours and then tested to yield the following results:

Tensile strength (p.s.i.) _____ 455
Elongation (percent) _____ 300
Die B, tear strength (p.i.) _____ 115
Shore A, hardness _____ 31

It should be noted that the final cured product had an exceptionally high tear strength considering that the viscosity of the base silanol-stopped polydimethylsiloxane used in Composition E was only 15,000 centipoise when measured at 25° C.

What is claimed is:

1. A room temperature vulcanizable silicone rubber composition suitable for molding applications with deep section cure and knotty tear comprising:
   (a) a base linear fluid organopolysiloxane containing terminal silicon-bonded hydroxy groups and having a viscosity of 1000 to 10,000,000 centipoise when measured at 25° C., the organic groups of said organopolysiloxane being selected from the class consisting of (I) a monomeric organo silicate corregenated monovalent hydrocarbon radicals, and cyanoalkyl radicals,
   (b) from 1 to 15% by weight of a silicate based on the linear organopolysiloxane selected from the class containing of (I) a monomeric organo silicate corresponding to the general formula, $$(R^5O)_3SiR^6$$

where $R^5$ is a radical selected from the class consisting of monovalent hydrocarbon radicals, halogenated monovalent hydrocarbon radicals and cyanoalkyl radicals, $R^6$ is selected from the class consisting of alkyl, haloalkyl, aryl, haloaryl, alkenyl, cycloalkyl, cycloalkenyl, cyanoalkyl, alkoxy and aryloxy radicals and (II) a liquid partial hydrolysis product of the aforementioned organosilicate, (c) from 0.1 to 5% by weight based on the linear organopolysiloxane of a catalyst which is a metallic salt of an organic monocarboxylic or dicarboxylic acid in which the metal ion is selected from the class consisting of lead, tin, zirconium, antimony, iron, cadmium, barium, calcium, titanium, bismuth and manganese, and
   (d) from 5% to 300% by weight based on the linear organopolysiloxane of a treated silica filler product prepared by intimately contacting per 100 parts of said silica filler having a surface area of at least 20 square meters per gram and containing from 0.2 to 2.0% by weight of moieties selected from the class consisting of hydroxyl groups, water and mixtures thereof with
      (1) from ½ part to 5 parts of a hydroxyl amine having the formula, $$R^1-\underset{\underset{R^2}{|}}{N}-OH$$

(2) from 2 to 25 parts of a cyclic siloxane of the formula, $$(R_2{}^3SiO)_n$$

and
      (3) from 1 to 20 parts of a silyl nitrogen compound of the formula, $$(R_3{}^4Si)_aX$$

wherein the above additives are simultaneously contacted with said filler at a temperature in the range of 100 to 180° C. and (II) removing residual amounts of said additives from the filler, when $R^1$ is selected from the class consisting of monovalent hydrocarbon radicals, $R^2$, $R^3$ and $R^4$ are all selected from the class consisting of hydrogen, monovalent hydrocarbon radicals and halogenated monovalent hydrocarbon radicals, $n$ varies from 3 to 4, $a$ is a whole number that varies from 1 to 2, X is selected from the class consisting of $-NR^5Y$, $-ONR_2{}^5$, and $$-\underset{\underset{|}{N}}{\overset{Y}{|}}-$$

where $R^5$ is selected from monovalent hydrocarbon radicals and halogenated monovalent hydrocarbon radicals and Y is selected from hydrogen and $R^5$ radicals.

2. The composition of claim 1 wherein the treated silica filler is produced by contacting it with said additives for 3 to 8 hours.

3. The composition of claim 1 wherein in the process for producing the treated silica filler, $R^1$ and $R^2$ are alkyl, the hydroxyl amine is diethylhydroxyl amine, $R^3$ and $R^4$ are alkyl, X is $$-\underset{\underset{|}{N}}{\overset{Y}{|}}-$$

$a$ is 2 and X is hydrogen.

4. The composition of claim 1 wherein the linear organopolysiloxane of (c) is a diorganopolysiloxane which has the formula, $$HO-\left[\underset{\underset{R^{42}}{|}}{\overset{R^{42}}{\underset{|}{Si}}}O\right]_r-H$$

where R is selected from the class consisting of monovalent hydrocarbon radicals, halogenated monovalent hydrocarbon radicals and cyanoalkyl radicals and $r$ is a whole number that varies from 300 to 5,260.

5. The composition of claim 1 wherein said silicate is polypropyl silicate and is present in an amount of 2 to 10% by weight of the linear organopolysiloxane.

6. The composition of claim 1 wherein the metallic salt is used at the concentration of 0.1 to 3.0% by weight of the linear organopolysiloxane.

7. The composition of claim 6 wherein the metallic salt of an organic monocarboxylic acid is dibutyl tin dilaurate.

8. The composition of claim 1 wherein in addition to said treated silica filler there is present 5% to 100% by weight based on the base linear organopolysiloxane of fillers selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromic oxide, zirconium oxide, aluminum oxide, crushed quartz, calcined clay, asbestos, carbon, graphite, cork, cotton and synthetic fibers.

9. The composition of claim 1 which further includes therein at a concentration of 5 to 50% by weight based on the base linear polysiloxane of a low molecular weight tert-alkoxy organopolysiloxane fluid which is comprised of chemically combined units of $R_2^{42}SiO$, with a mixture of tert-alkoxy diorganosiloxy units of the formula,

$$(R_3^{11}CO)R_2^{42}SiO_{1/2}$$

and hydroxydiorganosiloxy units of the formula,

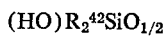
$$(HO)R_2^{42}SiO_{1/2}$$

where the ratio of the tert-alkoxy diorganosiloxy units to the hydroxydiorganosiloxy units is less than 1, $R^{42}$ is selected from monovalent hydrocarbon radicals, halogenated monovalent hydrocrbon radicals and cyonoalkyl radicals, $R^{11}$ is lower alkyl of 2 to 8 carbon atoms and the fluid has a viscosity of 1,000 to 10,000 centipoise at 25° C.

10. The composition of claim 9 wherein there is present at a concentration of 0.5 to 5% by weight base on the base linear organopolysiloxane fluid of a first viscosity depressant and deep section curing agent of the formula,

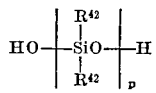
$$HO\!-\!\!\left[\begin{array}{c}R^{42}\\|\\SiO\\|\\R^{42}\end{array}\right]_p\!\!-\!H$$

wherein $R^{42}$ is a radical selected from the class consisting of monovalent hydrocarbon radicals, halogenated monovalent hydrocarbon radicals and cyanoalkyl radicals and $p$ is a whole number that varies from 2 to 46.

11. The composition of claim 10 wherein there is present at a concentration of 0 to 70% by weight based on the base linear organopolysiloxane fluid of a second viscosity depressant fluid of the formula,

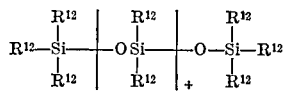
$$R^{12}\!-\!\!\underset{\underset{R^{12}}{|}}{\overset{\overset{R^{12}}{|}}{Si}}\!-\!\!\left[\!-\!O\underset{\underset{R^{12}}{|}}{\overset{\overset{R^{12}}{|}}{Si}}\!-\!\right]_{\pm}\!\!-\!O\!-\!\underset{\underset{R^{12}}{|}}{\overset{\overset{R^{12}}{|}}{Si}}\!-\!R^{12}$$

wherein said fluid may have a viscosity of 5 to 10,000 centipoise at 25° C., $\pm$ is a whole number that varies from 2 to 700 and $R^{12}$ is selected from the class consisting of alkyl radicals, halogenated alkyl radicals, aryl radicals, halogenated aryl radicals and cyanoalky radicals of up to 8 carbon atoms.

12. The composition of claim 1 wherein there is present at a concentration of 0.5 to 5% by weight based on the base linear organopolysiloxane polymer of a pigment.

13. The composition of claim 1 wherein there is added to said silicate and to said metal catalyst prior to combination of these ingredients with base linear organopolysiloxane, 0.1 to 10% by weight based on said silicate of an aqueous solution of a lower aliphatic alcohol of the formula,

$$R^{13}OH$$

where $R^{13}$ is a radical selected from the class consisting of alkyl and cycloalkyl radicals.

14. The composition of claim 13 wherein the lower aliphatic alcohol is dissolved in water at a concentration of 1 to 10% by weight.

15. A process for forming a room temperature vulcanizable silicone rubber composition in which a first part is stored separately from a second part prior to cure comprising mixing the first part with the second part with the second part so as to form the cured silicone rubber composition at room temperature wherein there is formed the first part by mixing (a) a base linear fluid organopolysiloxane containing terminal silicon-bonded hydroxy groups and having a viscosity of 1,000 to 10,000,000 centipoise when measured at 25° C., the organic groups of said organopolysiloxane being selected from the class consisting of monovalent hydrocarbon radicals, halogenated monovalent hydrocarbon radicals and cyanoalkyl radicals, and (b) from 5% to 300% by weight based on the linear organopolysiloxane of a treated silica filler product prepared by (1) intimately contacting per 100 parts of silica filler having a surface area of at least 20 square meters per gram and containing from 0.2 to 2.0% by weight of moieties selected from the class consisting of hydroxyl groups, water and mixtures thereof with (1) from ½ part to 5 parts of a hydroxyl amine having the formula,

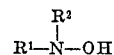
$$R^1\!-\!\underset{\underset{}{|}}{\overset{\overset{R^2}{|}}{N}}\!-\!OH$$

(2) from 2 to 25 parts of a cyclic siloxane of the formula,

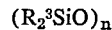
$$(R_2^3SiO)_n$$

and (3) from 1 to 20 parts of a silyl nitrogen compound of the formula,

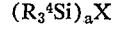
$$(R_3^4Si)_aX$$

wherein the above additives are simultaneously contacted with said filler at a temperature in the range of 100 to 180° C., and (II) removing residual amounts of said additives from the filler, where $R^1$ is selected from the class consisting of monovalent hydrocarbon radicals, halogenated monovalent hydrocarbon radicals, $R^2$, $R^3$ and $R^4$ are all selected from the class consisting of hydrogen, monovalent hydrocarbon radicals and halogenated monovalent hydrocarbon radicals, $n$ varies from 3 to 4, $a$ is a whole number that varies from 1 to 2, X is selected from the class consisting of $-NR^5Y$, $-ONR_2^5$, and

$$-\underset{\underset{}{|}}{\overset{\overset{Y}{|}}{N}}-$$

where $R^5$ is selected from monovalent hydrocarbon radicals and halogenated monovalent hydrocarbon radicals and Y is selected from hydrogen and $R^5$ radicals, and there is formed the second part by mixing (c) from 1 to 15% by weight of a silicate based on the base linear organopolysiloxane selected from the class consisting of (1) a monomeric organosilicate corresponding to the general formula,

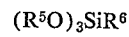
$$(R^5O)_3SiR^6$$

where $R^5$ is a radical selected from the class consisting of monovalent hydrocarbon radicals, halogenated monovalent hydrocarbon radicals and cyanoalkyl radicals, $R^6$ is selected from the class consisting of alkyl, haloalkyl, aryl, haloaryl, alkenyl, cycloalkyl, cylcoalkenyl, cyanoalkyl, alkoxy and aryloxy radicals and (2) a liquid partial hydrolysis product of the aforementioned alkyl silicate; and (d) from 0.1 to 5% by weight based on the linear organopolysiloxane of a catalyst which is a metallic salt of an organic monocarboxylic and dicarboxylic acid in which the metal ion is selected from the class consisting of lead, tin, zirconium, antimony, iron, cadmium, barium, calcium, titanium, bismuth and manganese.

16. The process of claim 15 wherein the treated silica filler is produced by contacting it with said additives for 3 to 8 hours.

17. The process of claim 15 wherein in the process for producing the treated silica filler, $R^1$ and $R^2$ are alkyl, the hydroxyl amine is diethylhydroxyl amine, $R^3$ and $R^4$ are alkyl, X is

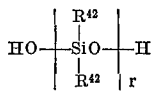

and $a$ is 2 and X is hydrogen.

18. The process of claim 15 wherein the base linear organopolysiloxane is a diorganopolysiloxane which has the formula,

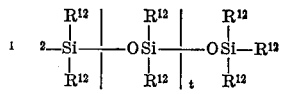

where R is selected from the class consisting of monovalent hydrocarbon radicals, halogenated monovalent hydrocarbon radicals, and cyanoalkyl radicals, and $r$ is a whole number that varies from 300 to 5,260.

19. The process of claim 15 wherein said silicate is polypropylsilicate and is present at a concentration of 2 to 10% by weight based on the base linear organopolysiloxane.

20. The process of claim 15 wherein the metallic salt is used at the concentration of 0.1 to 3.0% by weight of the linear organopolysiloxane.

21. The process of claim 20 wherein the metallic salt of an organic monocarboxylic acid is dibutyl tin dilaurate.

22. The process of claim 15 wherein in addition to the treated silica filler there is present in said first part 5% to 100% by weight based on the base linear organopolysiloxane of filler selected from the class consisting of titanium dioxide, lithopone, zinc oxide, zirconium silicate, silica aerogel, iron oxide, diatomaceous earth, calcium carbonate, fumed silica, precipitated silica, glass fibers, magnesium oxide, chromine oxide, zirconium oxide, aluminum oxide, crushed quartz, calcined clay, asbestos, carbon graphite, cork, cotton, and synthetic fibers.

23. The process of claim 15 wherein in said first part further comprising mixing therein at a concentration of 5 to 50% by weight based on the linear base polysiloxane of a low molecular weight tert-alkoxy organopolysiloxane fluid which is composed of chemically combined units of $$R_2{}^{42}SiO$$

with a mixture of tert-alkoxy diorganosiloxy units of the formula, $$(R_3{}^{11}CO)R_2{}^{42}SiO_{1/2}$$

and hydroxydiorganosiloxy units of the formula, $$(HO)R_2{}^{42}SiO_{1/2}$$

where the ratio of the tert-alkoxy diorganosiloxy units to the hydroxydiorganosiloxy units is less than 1, $R^{42}$ is selected from monovalent hydrocarbon radicals, halogenated monovalent hydrocarbon radicals, and cyanoalkyl radicals, $R^{11}$ is a lower alkyl of 1 to 8 carbon atoms and the fluid has a viscosity of 1,000 to 10,000 centipoise at 25° C.

24. The process of claim 23 wherein in said first part further comprising mixing therein at a concentration of 0.2 to 20% by weight based on the base linear organopolysiloxane fluid of a first viscosity depressant of the formula,

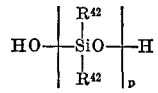

wherein R is a radical selected from the class consisting of monovalent hydrocarbon radicals, halogenated monovalent hydrocarbon radicals and cyanoalkyl radicals and $p$ is a whole number that varies from 2 to 46.

25. The process of claim 24 wherein in said first part further comprising mixing therein at a concentration of 0 to 70% by weight based on the base linear organopolysiloxane fluid of a second viscosity depressant fluid of the formula,

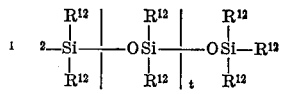

wherein said fluid may have a viscosity of 5 to 10,000 centipoise at 25° C., $t$ is a whole number that varies from 2 to 700 and $R^{12}$ is selected from the class consisting of alkyl radicals, halogenated alkyl radicals, aryl radicals, halogenated aryl radicals and cyanoalkyl radicals of up to 8 carbon atoms.

26. The process of claim 15 wherein further comprising mixing in said second part 0.1 to 5% by weight based on said silicate of an aqueous solution of a lower aliphatic alcohol of the formula, $$R^{13}OH$$

where $R^{13}$ is a radical selected from the class consisting of alkyl and cycloalkyl radicals.

27. The process of claim 15 wherein said treated filler is a filler having a surface area of at least 50 square meters per gram containing 4% to 20% by weight of chemically combined organosiloxy units of the formulas $R_3{}^4Si—$ and 2 to 10% by weight of chemically combined diorganosiloxy units of the formula $R_2{}^3Si—$ wherein $R^3$ and $R^4$ are as previously defined.

28. The composition of claim 1 wherein said treated filler is a filler having a surface area of at least 50 square meters per gram containing 4% to 20% by weight of chemically combined organosiloxy units of the formula, $$R_3{}^4Si—\ \text{and}$$

2 to 10% by weight of chemically combined diorganosiloxy units of the formula, $$R_2{}^3Si—$$

wherein $R^3$ and $R^4$ are as previously defined.

References Cited

UNITED STATES PATENTS

| | | | |
|---|---|---|---|
| 3,649,320 | 3/1972 | Yates | 260—37 SB X |
| 3,635,743 | 1/1972 | Smith | 106—308 N X |
| 3,541,044 | 11/1970 | Beers et al. | 260—37 SB |

LEWIS T. JACOBS, Primary Examiner

U.S. Cl. X.R.

106—308 N; 260—29.2 M, 33.4 SB, 37 SB